(12) United States Patent
Panec et al.

(10) Patent No.: US 11,070,958 B2
(45) Date of Patent: Jul. 20, 2021

(54) MANAGING WEARABLE DEVICE FRIENDSHIPS WITHOUT EXCHANGING PERSONAL INFORMATION

(71) Applicant: Disney Enterprises, Inc., Burbank, CA (US)

(72) Inventors: Timothy M. Panec, Studio City, CA (US); Stephen A. Thornton, Burbank, CA (US); Katherine M. Bassett, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 203 days.

(21) Appl. No.: 15/871,357

(22) Filed: Jan. 15, 2018

(65) Prior Publication Data

US 2019/0222975 A1 Jul. 18, 2019

(51) Int. Cl.
| | |
|---|---|
| *H04W 4/21* | (2018.01) |
| *G06Q 50/00* | (2012.01) |
| *H04L 29/08* | (2006.01) |
| *G06F 1/16* | (2006.01) |
| *H04W 4/80* | (2018.01) |
| *G06F 21/62* | (2013.01) |

(52) U.S. Cl.
CPC ............ *H04W 4/21* (2018.02); *G06F 1/163* (2013.01); *G06F 21/6245* (2013.01); *G06Q 50/01* (2013.01); *H04L 67/306* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 9,730,046 | B2* | 8/2017 | Liu .................... | H04W 4/08 |
| 2011/0029611 | A1* | 2/2011 | Hutchison ............ | G06Q 30/02 |
| | | | | 709/204 |
| 2013/0173658 | A1* | 7/2013 | Adelman ............... | H04W 4/02 |
| | | | | 707/769 |
| 2014/0068736 | A1* | 3/2014 | Agerstam ............ | H04W 12/06 |
| | | | | 726/7 |

(Continued)

OTHER PUBLICATIONS

Yufeng Wang, Li Wei, Athanasios V. Vasilakos, Qun Jin, "Device-to-Device based mobile social networking in proximity (MSNP) on smartphones: Framework, challenges and prototype, Future Generation Computer Systems," vol. 74, 2017, pp. 241-253. (Year: 2015).*

*Primary Examiner* — Andrew B Whitaker
(74) *Attorney, Agent, or Firm* — Patterson + Sheridan, LLP

(57) ABSTRACT

Systems, methods and articles of manufacture for performing an operation comprising receiving, by a first wearable device, input specifying to establish a relationship with a second wearable device within a predefined distance of the first wearable device, receiving, by the first wearable device from the second wearable device via wireless data transmissions, an identifier of the second wearable device, a tile identifier of a tile communicably coupled to a tile interface of the second wearable device, and a state associated with the tile; and storing, in a first entry of a data structure of the first wearable device, an indication of the relationship with the second wearable device, wherein the indication comprises the identifier of the second wearable device, the tile identifier, and the state associated with the tile.

20 Claims, 13 Drawing Sheets

(56) References Cited

U.S. PATENT DOCUMENTS

| | | | | |
|---|---|---|---|---|
| 2015/0073907 A1* | 3/2015 | Purves | ............... | G06Q 20/32 |
| | | | | 705/14.58 |
| 2015/0140934 A1* | 5/2015 | Abdurrahman | ......... | H04W 4/70 |
| | | | | 455/41.2 |
| 2015/0147968 A1* | 5/2015 | Friedman | ............. | G06F 3/017 |
| | | | | 455/41.2 |
| 2015/0177939 A1* | 6/2015 | Anderson | ............ | G06F 3/017 |
| | | | | 715/745 |
| 2015/0312406 A1* | 10/2015 | Yan | ..................... | G06Q 50/01 |
| | | | | 455/414.1 |
| 2016/0036962 A1* | 2/2016 | Rand | ............... | H04M 1/72563 |
| | | | | 455/418 |
| 2016/0063485 A1* | 3/2016 | Tunnell | ............. | G06Q 20/363 |
| | | | | 705/41 |
| 2017/0006412 A1* | 1/2017 | Dow | ................... | H04W 76/10 |
| 2017/0126688 A1* | 5/2017 | Jones-McFadden | ........................ | |
| | | | | H04L 63/102 |
| 2017/0181645 A1* | 6/2017 | Mahalingam | ........ | A61B 5/0004 |

\* cited by examiner

*FIG. 2D*

| ENTRY | TILE | STATE | TIME | USERNAME |
|---|---|---|---|---|
| 1 | $118_4$ | Sweet | 11:00:00 | SweetSally |
| 2 | $118_1$ | Silly | 12:00:00 | SillyBilly |
| ⋮ | ... | ... | ... | ... |
| N | | | | |

COMPUTING DEVICE $102_2$

120

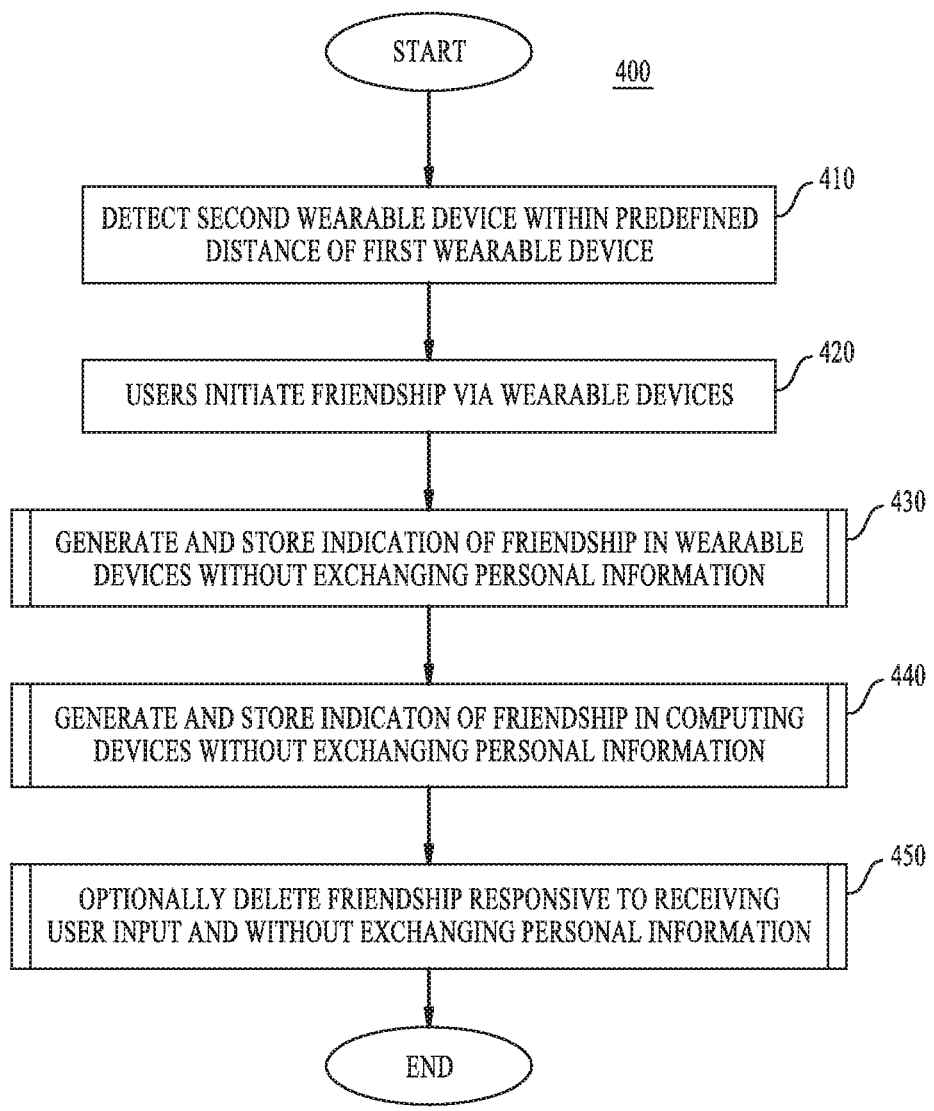

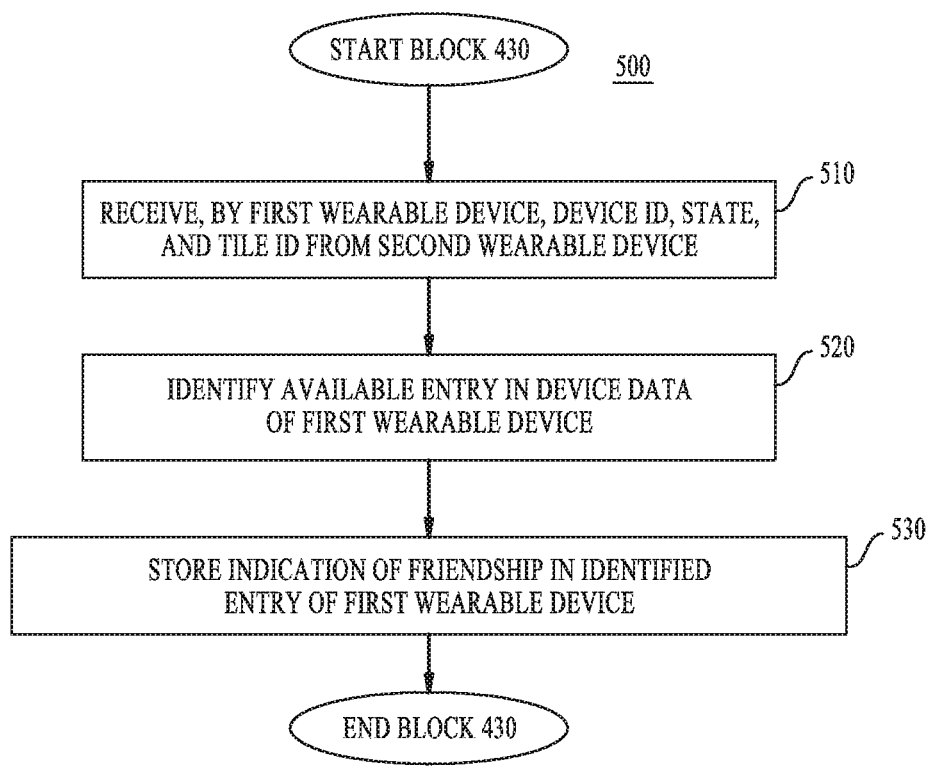

MANAGING WEARABLE DEVICE FRIENDSHIPS WITHOUT EXCHANGING PERSONAL INFORMATION

BACKGROUND

Field of the Invention

Embodiments disclosed herein relate to wearable devices. More specifically, embodiments disclosed herein relate to managing wearable device friendships without requiring the users to exchange personal information.

Description of the Related Art

Social networks allow users to become "friends" on different types of platforms. However, such platforms often require users to exchange personally identifiable information. Often, it is desirable to preserve the anonymity of users. Conventional solutions for allowing users of wearable devices to establish friendships via the wearable devices often do not preserve the anonymity of the users. Therefore, there is a need for enhanced solutions to allow users to establish friendships via wearable devices without exchanging personally identifiable information.

SUMMARY

According to one embodiment of the present disclosure, a method comprises receiving, by a first wearable device, input specifying to establish a relationship with a second wearable device within a predefined distance of the first wearable device, receiving, by the first wearable device from the second wearable device via wireless data transmissions, an identifier of the second wearable device, a tile identifier of a tile communicably coupled to a tile interface of the second wearable device, and a state associated with the tile; and storing, in a first entry of a data structure of the first wearable device, an indication of the relationship with the second wearable device, wherein the indication comprises the identifier of the second wearable device, the tile identifier, and the state associated with the tile.

In another embodiment, a system comprises a processor and a memory containing a program which when executed by the processor performs an operation comprising receiving, by a first wearable device, input specifying to establish a relationship with a second wearable device within a predefined distance of the first wearable device, receiving, by the first wearable device from the second wearable device via wireless data transmissions, an identifier of the second wearable device, a tile identifier of a tile communicably coupled to a tile interface of the second wearable device, and a state associated with the tile; and storing, in a first entry of a data structure of the first wearable device, an indication of the relationship with the second wearable device, wherein the indication comprises the identifier of the second wearable device, the tile identifier, and the state associated with the tile.

In another embodiment, a non-transitory computer readable medium stores instructions, which, when executed by a processor, performs an operation comprising receiving, by a first wearable device, input specifying to establish a relationship with a second wearable device within a predefined distance of the first wearable device, receiving, by the first wearable device from the second wearable device via wireless data transmissions, an identifier of the second wearable device, a tile identifier of a tile communicably coupled to a tile interface of the second wearable device, and a state associated with the tile; and storing, in a first entry of a data structure of the first wearable device, an indication of the relationship with the second wearable device, wherein the indication comprises the identifier of the second wearable device, the tile identifier, and the state associated with the tile.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 2A-2D illustrate examples of managing wearable device friendships without requiring the users to exchange personal information, according to one embodiment.

FIG. 4 is a flow chart illustrating a method to manage wearable device friendships without requiring the users to exchange personal information, according to one embodiment.

FIG. 5 is a flow chart illustrating a method to generate and store an indication of friendship in wearable devices without requiring the users to exchange personal information, according to one embodiment.

DETAILED DESCRIPTION

Embodiments disclosed herein provide wearable devices that can establish "friendship" relationships without requiring users to exchange personally identifiable information. For example, two users may wish to establish a friendship relationship via their wearable devices. When the users bring their wearable devices within a predefined distance of each other, the wearable devices engage in wireless data communications. Responsive to user input (e.g., pressing a button on the wearable devices), a friendship relationship is established, and an indication of the friendship is stored in the respective wearable devices. The wearable devices may further transmit an indication of the friendship relationship to an associated computing device, where the user may associate a predefined username to the other person, where the predefined username does not include personally identifiable information. Once the user selects the predefined username, the computing device stores an indication of the selected username as a contact record in the computing device, without storing any personally identifiable information.

Figure 1A:
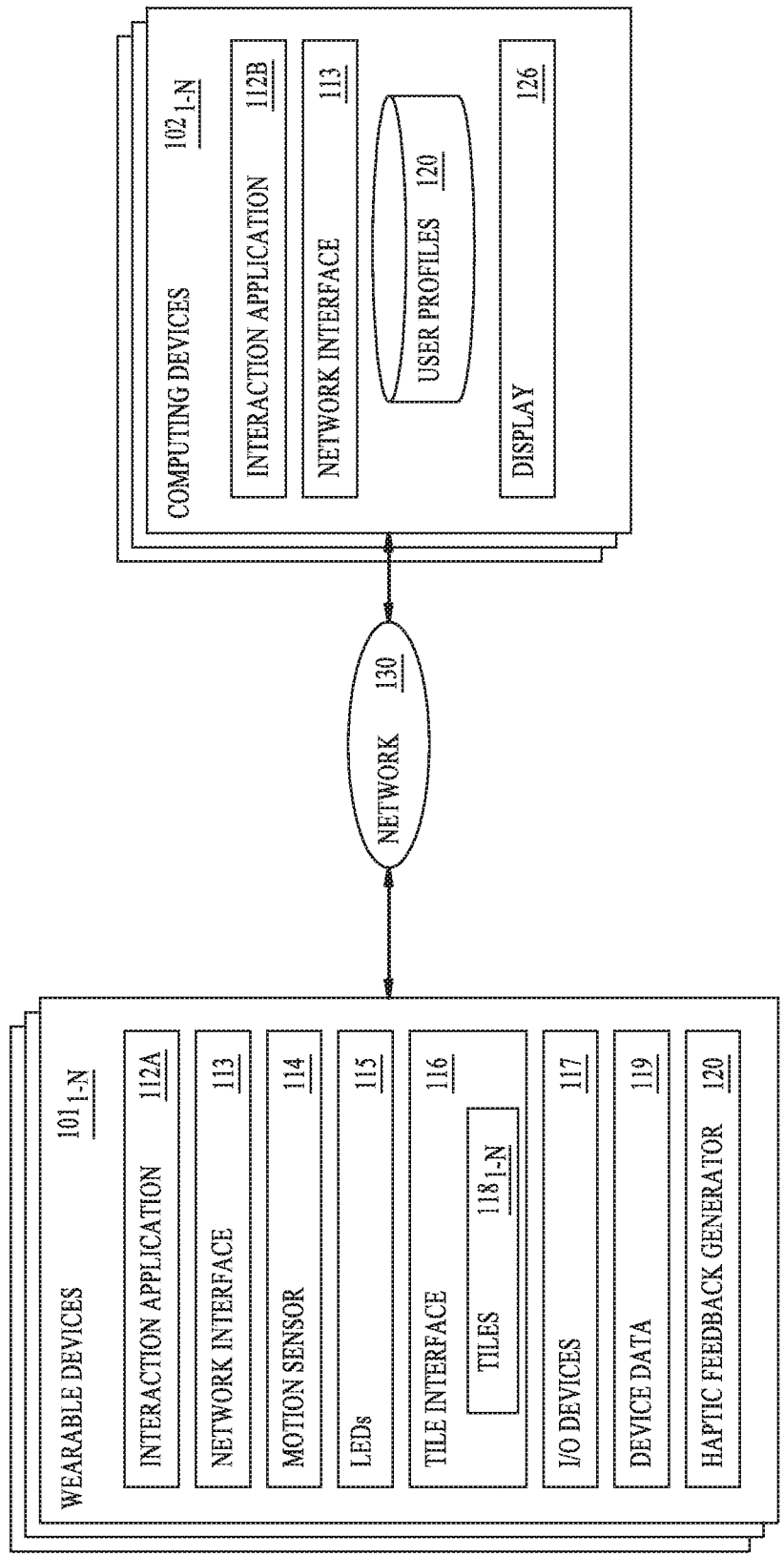
FIGS. 1A-1B illustrates a system which manages wearable device friendships without requiring the users to exchange personal information, according to one embodiment.

FIG. 1A illustrates a system 100 which establishes wearable device friendships without requiring the users to exchange personal information, according to one embodiment. As shown, the system 100 includes a plurality of wearable devices $101_{1-N}$ and a plurality of computing devices $102_{1-N}$ communicably coupled by a network 130. As shown, the wearable devices $101_{1-N}$ include an instance of an interaction application 112A, a network interface 113, a motion sensor 114, one or light emitting diodes (LEDs) 115, a tile interface 116 for accepting tiles 118, one or more input/output (I/O) devices 117, a data store of device data 119, and a haptic feedback generator 120. The wearable devices $101_{1-N}$ are representative of any type of wearable device that includes a tile interface 116, such as a smart watch, fitness tracker, and the like. The network interface 113 facilitates wireless data transmissions between a given wearable device $101_{1-N}$ and other wearable devices $101_{1-N}$, as well as between the wearable devices $101_{1-N}$ and the computing devices $102_{1-N}$. Example network interfaces 113 include wireless local area network (WLAN) interfaces, Bluetooth® interfaces, radio frequency interfaces that allow data communications between two wearable devices $101_{1-N}$, and the like. In some embodiments, the network interfaces 113 emit broadcast wireless communications that are received by other wearable devices $101_{1-N}$ in proximity. The motion sensor 114 is representative of any hardware module which can detect motion, such as an accelerometer, gyroscope, global positioning system (GPS) radios, and some network interfaces 113. The I/O devices 117 are representative of one or more buttons for receiving user input. The device data 119 stores data describing one or more tiles $118_{1-N}$ currently and/or previously inserted in the tile interface 116, as well as "friendship" information reflecting relationships between a given wearable device $101_{1-N}$ and other wearable devices $101_{1-N}$. The haptic feedback generator 120 is representative of any device configured to output haptic feedback, such as an actuator.

The tile interface 116 is representative of hardware modules configured to interface with the hardware tiles 118. The tiles $118_{1-N}$ are representative of hardware elements that can plug into the tile interface 116, and transfer data to the wearable devices $101_{1-N}$ via a data connection. Each of the tiles $118_{1-N}$ may be associated with a fictional character, or "emoji", and include a depiction of the associated fictional character (or emoji). In at least one embodiment, each tile $118_{1-N}$ is further associated with a predefined emotion. For example, a "happy duck" tile $118_{1-N}$ may be a physical tile with a smiling duck drawn on it, which, when plugged in to the tile interface 116, allows the user to convey that they are currently happy. Each tile $118_{1-N}$ stores an identifier that is unique to each character and/or emotion. For example, all "happy duck" tiles $118_{1-N}$ may share the same identifier, while all "silly penguin" tiles $118_{1-N}$ may share the same identifier, different than the "happy duck" identifier. The unique identifier, when received via the tile interface 116, is stored in a record in the device data 119. The record stored in the device data 119 may also reflect the emotion associated with the tile $118_{1-N}$. The network interface 113 continuously broadcasts the identifier of the tile $118_{1-N}$ that is inserted in the tile interface 116. Furthermore, the wearable devices $101_{1-N}$ are configured to output a predefined light pattern via associated with the unique identifier via the LEDs 115. For example, if there are four LEDs 115 included in the wearable devices $101_{1-N}$, the identifier of the "silly penguin" tile 118 may be predefined to cause two of the LEDs 115 to emit a red light, and the other two LEDs 115 to emit a blue light. Similarly, the identifier of the "happy duck" tile 118 may cause two of the LEDs 115 to emit orange light, and the other two LEDs 115 to emit blue light. Furthermore, color animation via the LEDs 115 may be used to convey emotion, e.g., slowly pulsing all LEDs 115 to fade in and fade out blue light may convey sadness, while a circular pattern outputted via the LEDs 115 that increases in speed may convey happiness.

As shown, each of the computing devices $102_{1-N}$ include a respective instance of the interaction application 112B, a network interface 113, a data store of user profiles 120, and a display device 126. The computing devices $102_{1-N}$ are representative of any type of computing device, such as a smartphone, wearable computing device, tablet computer, portable game console, laptop computer, desktop computer, and the like. The user profiles 120 store profile data for a plurality of different users without storing any personally identifiable information. For example, the user profiles 120 may store a set of non-identifying user attributes (e.g., emotions, positional information, activities engaged in, achievements, relationships, friendships between wearable devices $101_{1-N}$, exchanges of tiles 118, etc.).

The interaction application 112 (which includes instances 112A and 112B) is configured to track tiles 118 affixed to a given wearable device $101_{1-N}$ via the tile interface 116, determine positional information (e.g., based on the network interface 113 and/or motion sensor 114) and manage friendship relationships between two or more users (e.g., via the corresponding wearable devices $101_{1-N}$ and/or computing devices $102_{1-N}$). For example, as previously stated, the wearable devices $101_{1-N}$ are configured to detect other wearable devices $101_{1-N}$ via the respective network interfaces 113. When the network interface 113 of a wearable device $101_{1-N}$ receives broadcast data transmitted by another wearable device $101_{1-N}$, the respective instances of the interaction application 112A may broadcast an indication of an identifier of the wearable device $101_{1-N}$, the identifier of the tile $118_{1-N}$ currently inserted in the tile interface 116, and the emotion (or state) associated with the inserted tile $118_{1-N}$. In at least one embodiment, the identifier of a given wearable device $101_{1-N}$ is the media access control (MAC) address of the network interface 113 of the wearable device $101_{1-N}$. The respective instances of the interaction application 112A may then record an indication of the encounter between the wearable devices $101_{1-N}$ in the device data 119. The indication may include the identifier of the wearable devices $101_{1-N}$ that participated in the encounter, the identifier of the tiles $118_{1-N}$ (if present) in each wearable device $101_{1-N}$, and a timestamp when the encounter occurred. As such, the interaction application 112 is configured to create friendship relationships via the wearable devices $101_{1-N}$ without exchanging personally identifiable information of the corresponding users.

For example, the users of a first wearable device $101_{1-N}$ and a second wearable device $101_{1-N}$ may wish to enter into a friendship relationship via the first and second wearable devices $101_{1-N}$. When the first and second wearable devices $101_{1-N}$ are within a predefined distance, the first and second users may hold a button (e.g., an I/O device 117) on the first and second wearable devices $101_{1-N}$ for a predefined period of time to initiate establishment of the friendship connection. In at least one embodiment, the users must provide the input via the I/O devices 117 within a predefined amount of time (e.g., the user of the second wearable device $101_{1-N}$ must provide input via the button within 5 seconds of the first wearable device $101_{1-N}$ providing input via the button). In response, the interaction application 112A of the first wearable device $101_{1-N}$ transmits, to the second wearable device $101_{1-N}$, the identifier of the first wearable device $101_{1-N}$, the identifier of the tile $118_{1-N}$ (if any) in the tile interface 116 of the first wearable device $101_{1-N}$, and the emotion (or state) associated with the tile $118_{1-N}$. The interaction application 112A of the second wearable device $101_{1-N}$ may then receive the transmitted data, and store an indication of the received data in a record of the device data 119 of the second wearable device $101_{1-N}$, reflecting the friendship relationship between the first and second wearable devices $101_{1-N}$. The stored indication may include a timestamp reflecting the time the friendship was established, where the receiving second wearable device $101_{1-N}$ generates the timestamp based on a local time source (e.g., a clock) of the second wearable device $101_{1-N}$. The interaction application 112A of the second wearable device $101_{1-N}$ may cause the LEDs 114 of the second wearable device $101_{1-N}$ to output feedback based on the identifier of the tile $118_{1-N}$ of the first wearable device $101_{1-N}$.

Similarly, the interaction application 112A of the second wearable device $101_{1-N}$ transmits the identifier of the second wearable device $101_{1-N}$, the identifier of the tile $118_{1-N}$ (if any) in the tile interface 116 of the second wearable device $101_{1-N}$ to the first wearable device $101_{1-N}$, and the emotion (or state) associated with the tile $118_{1-N}$. The interaction application 112A of the first wearable device $101_{1-N}$ then stores an indication of the received data in a record of the device data 119 of the first wearable device $101_{1-N}$, reflecting the friendship relationship between the first and second wearable devices $101_{1-N}$. The interaction application 112A of the first wearable device $101_{1-N}$ may also generate (e.g., based on a clock) and store a timestamp reflecting when the friendship was established. The interaction application 112A of the first wearable device $101_{1-N}$ may cause the LEDs 114 of the first wearable device $101_{1-N}$ to output feedback based on the identifier of the tile $118_{1-N}$ of the second wearable device $101_{1-N}$.

The interaction application 112A of each wearable device $101_{1-N}$ may then transmit an indication of the friendship data stored in the respective device data 119 to an associated computing device $102_{1-N}$, including the identifier of the tile $118_{1-N}$, the timestamp, and the record in the device data 119 where the friendship record was stored (e.g., record number 10 of 20 possible records in the device data 119). The interaction application 112B of the associated computing device $102_{1-N}$ may then generate a graphical user interface (GUI) that allows the user to save a "contact" for the other user in the user profiles 120. The GUI may include a plurality of predefined names that can be associated with the other user. For example, the interaction application 112B on the computing device $102_{1-N}$ of the first user may output a plurality of different names in the GUI. The first user may then select one of the predefined names. The interaction application 112B on the computing device $102_{1-N}$ may then store the selected name as a part of contact record for the second user in the user profiles 120, where the contact record further specifies the identifier of the tile 118 in the wearable device $101_{1-N}$ of the second user, and a timestamp reflecting when the friendship was created. Doing so allows creation of a contact record in the user profiles 120 without revealing the personal information of the second user (or any other user) to any other users including the first user.

If a user wishes to delete an entry from the user profiles 120 and/or the device data 119, the user may select the predefined username associated with the entry via a GUI provided by the interaction application 112B on the user's computing device $102_{1-N}$. The interaction application 112B then deletes the entry from the user profile 120 based on the record identifier of the entry associated with the selected username. The interaction application 112B then transmits the record identifier to the instance of the interaction application 112A on the associated wearable device $101_{1-N}$. The instance of the interaction application 112A then deletes the record from the device data 119.

Figure 1B:
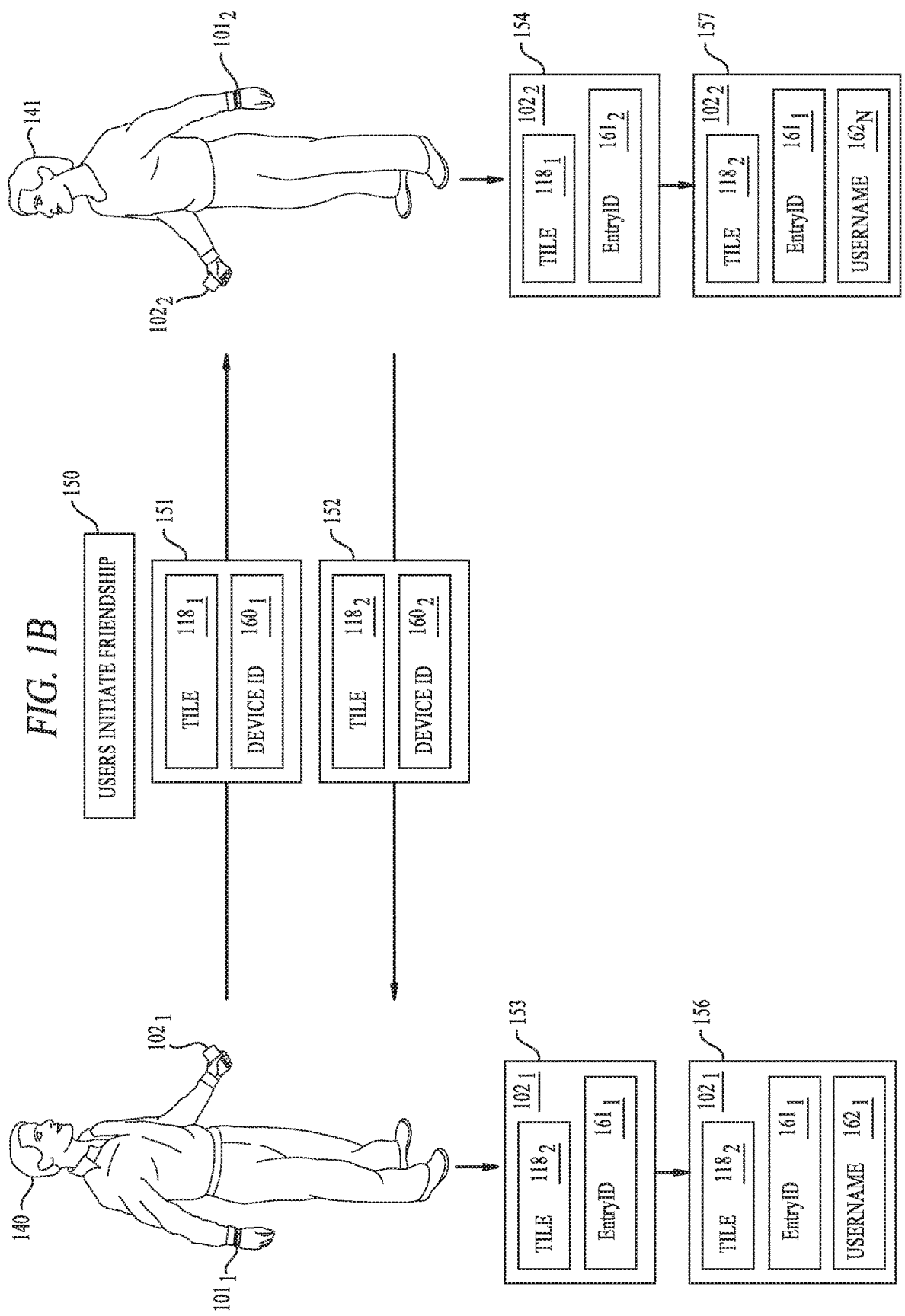

FIG. 1B depicts two example users 140, 141 of wearable devices $101_{1,2}$, respectively, and computing devices $102_{1,2}$, respectively. As shown in block 150, the users 140, 141 initiate a friendship relationship via the wearable devices $101_{1,2}$, e.g., by pressing a button (e.g., an I/O device 117) on the wearable devices $101_{1,2}$ for a predefined amount of time. Wearable device $101_1$ may include an example tile $118_1$, while wearable device $101_2$ may include an example $118_2$. At event 151, the wearable device $101_1$ transmits an indication of the tile identifier of the tile $118_1$ and an indication of a device ID $160_1$ of the wearable device $101_1$ to the wearable device $101_2$. The device ID $160_1$ may be the MAC address of the network interface 113 of the wearable device $101_1$. Once received, the wearable device $101_2$ stores an indication of the friendship relationship with wearable device $101_1$ in the device data 119 of the wearable device $101_2$. The indication may include a timestamp reflecting when the relationship was established, the identifier of tile $118_1$, and the device ID $160_1$. Similarly, at event 151, the wearable device $101_2$ transmits an indication of the tile identifier of the tile $118_2$ and an indication of a device ID $160_2$ of the wearable device $101_2$ to the wearable device $101_1$. The device ID $160_2$ may be the MAC address of the network interface 113 of the wearable device $101_2$. Once received, the wearable device $101_1$ stores an indication of the friendship relationship with wearable device $101_2$ in the device data 119 of the wearable device $101_1$. The indication may include a timestamp reflecting when the relationship was established, the identifier of tile $118_2$, and the device ID $160_2$.

At event 153, the wearable device $101_1$ transmits, to the computing device $102_1$, the identifier of tile $118_2$ an indication of the entry in the device data 119 where the friendship relationship is stored (e.g., entry 1 of 10). At event 155, the user 140 specifies a random username $162_1$ for the user 141 without including any personally identifiable information for the user 141. In at least one embodiment, the user 140 selects one of a plurality of predefined usernames $162_{1-N}$ that do not include any personally identifiable information as the username for user 141.

At event 154, the wearable device $101_2$ transmits, to the computing device $102_2$, the identifier of tile $118_1$ an indication of the entry in the device data 119 where the friendship relationship is stored (e.g., entry 8 of 10). At event 156, the user 141 specifies a username $162_N$ for the user 140 without including any personally identifiable information for the user 140. In at least one embodiment, the user 140 selects one of a plurality of predefined usernames $162_{1-N}$ that do not include any personally identifiable information as the username for user 141.

Figure 2A:
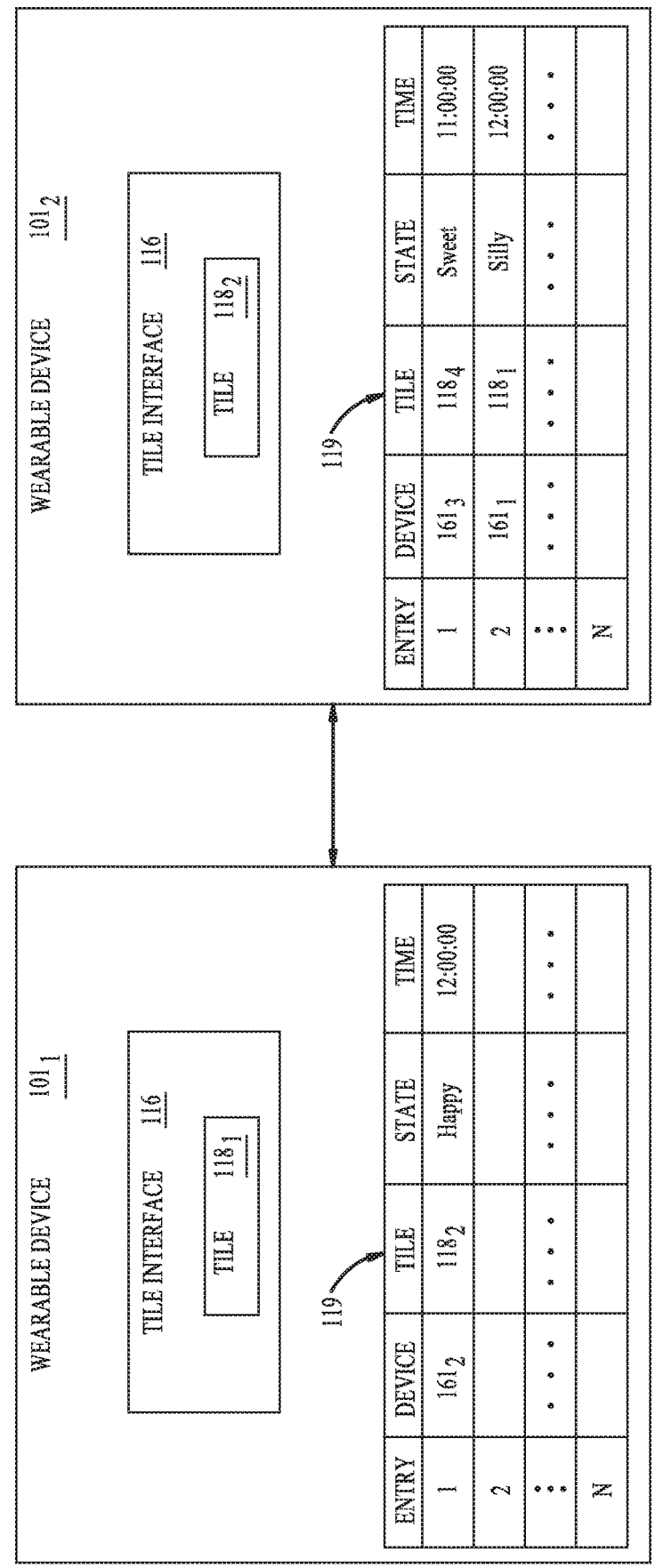

FIG. 2A illustrates examples of tracking wearable device friendships without exchanging personal information, according to one embodiment. As shown, FIG. 2A depicts two example wearable devices $101_{1,2}$. Illustratively, wearable device $101_1$ includes an example tile $118_1$ in the tile interface 116, while wearable device $101_2$ includes an example tile $118_2$ in the tile interface 116. When the wearable devices $101_{1,2}$ are within a predefined distance of each other, the wearable devices $101_{1,2}$ engage in wireless transmissions (and/or communications) via the network interfaces 113. The users of the wearable devices $101_{1,2}$ may initiate the creation of a friendship relationship by simultaneously pressing a button (e.g., an I/O device 117) on the wearable devices $101_{1,2}$ for a predefined amount of time. In response, the interaction applications 112A of the wearable device process the friendship relationship. Specifically, the interaction applications 112A transmit an indication of the device identifier of the respective wearable device $101_{1,2}$ and the tile identifier of the tile 118 in the tile interface 116 (if any) to the other wearable device $101_{1,2}$. The instance of the interaction application 112A on the receiving wearable device $101_{1,2}$ then creates an entry reflecting the friendship relationship in the device data 119.

For example, as shown, the device data 119 of wearable device $101_1$ now includes, in record entry 1 (of an example N entries for storing friendship relationships in the device data 119), an indication of the device ID $161_2$ of wearable device $101_2$, an indication of the identifier of the tile $118_2$, an indication of the emotional state associated with tile $118_2$, and a timestamp reflecting an example time the friendship relationship was created. Similarly, the device data 119 of wearable device $101_2$ now includes, in record entry 2, an indication of the device ID $161_1$ of wearable device $101_1$, an indication of the identifier of the tile $118_1$, an indication of the emotional state associated with tile $118_1$, and a timestamp reflecting the example time the friendship relationship was created. As previously stated, the identifiers 160 of the devices $101_{1,2}$ may be the MAC address of the respective network interfaces 113, and the identifier of the tiles $118_{1,2}$ may be any identifier unique to the corresponding class of tiles.

Figure 2B:
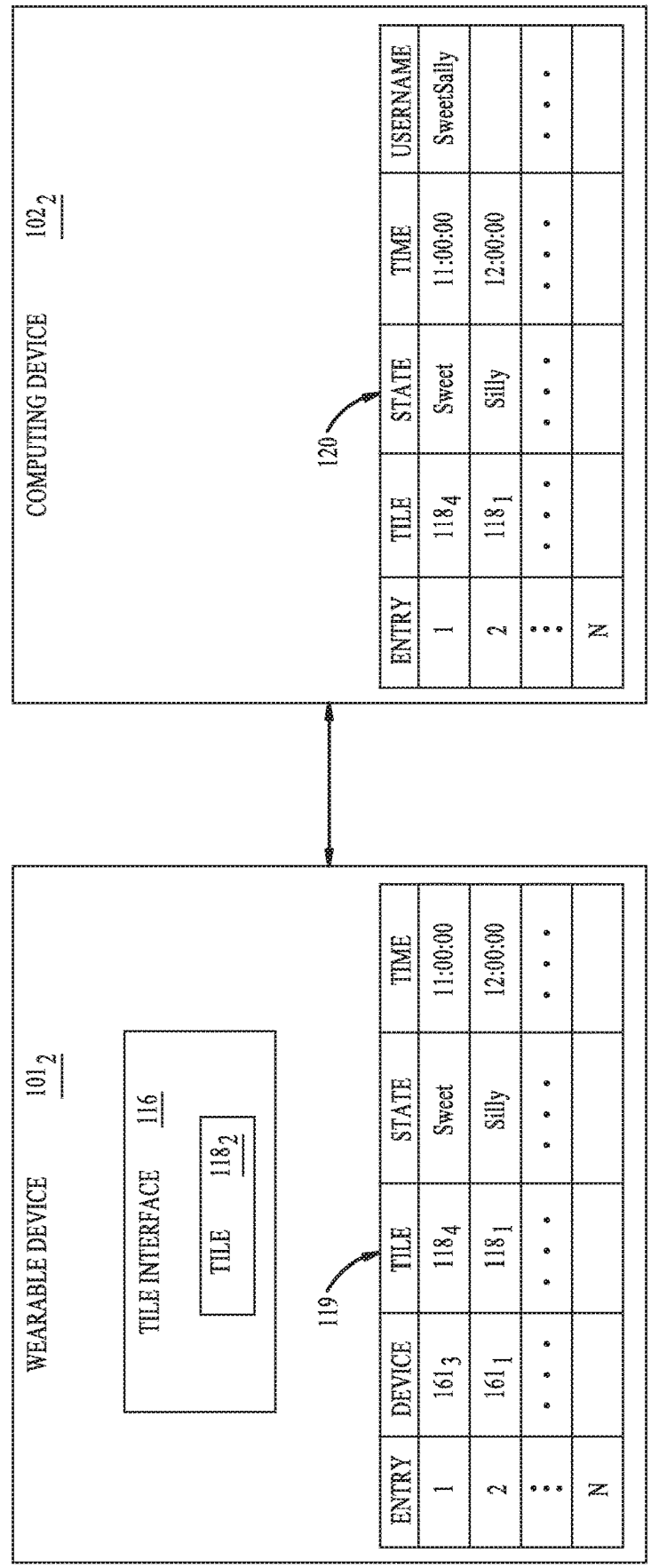

FIG. 2B depicts an example where the wearable device $101_2$ provides data describing the friendship relationship established between wearable devices $101_{1,2}$ to an example computing device $102_2$. Generally, the wearable device $101_2$ may wirelessly transmit, to the computing device $102_2$ via the network interface 113, an indication of the tile identifier of tile $118_1$, the emotional state associated with tile $118_1$, the timestamp the friendship was created, and the entry in the device data 119 where the friendship relationship with wearable device $101_1$ was stored. As shown, therefore, the computing device $102_2$ updates the user profile data 120 to include an indication of the identifier of the tile $118_1$, the emotional state associated with tile $118_1$, the timestamp the friendship was created, and an indication that the friendship relationship is stored in entry 2 of the device data 119 of the wearable device $101_2$. Furthermore, as shown, the user profiles 120 include a column for a username. For example, the user profile 120 associated with entry 1 of the device data 119 includes an example username "SweetSally". However, the user profile associated with entry 2 (e.g., device ID $161_1$ of wearable device $101_1$) does not include an associated username, because the wearable device $101_1$ does not transmit any information other than the entry identifier to the computing device $102_2$. Instead, the user of the computing device $102_2$ must select a predefined username to associate with the user of wearable device $101_1$.

Figure 2C:
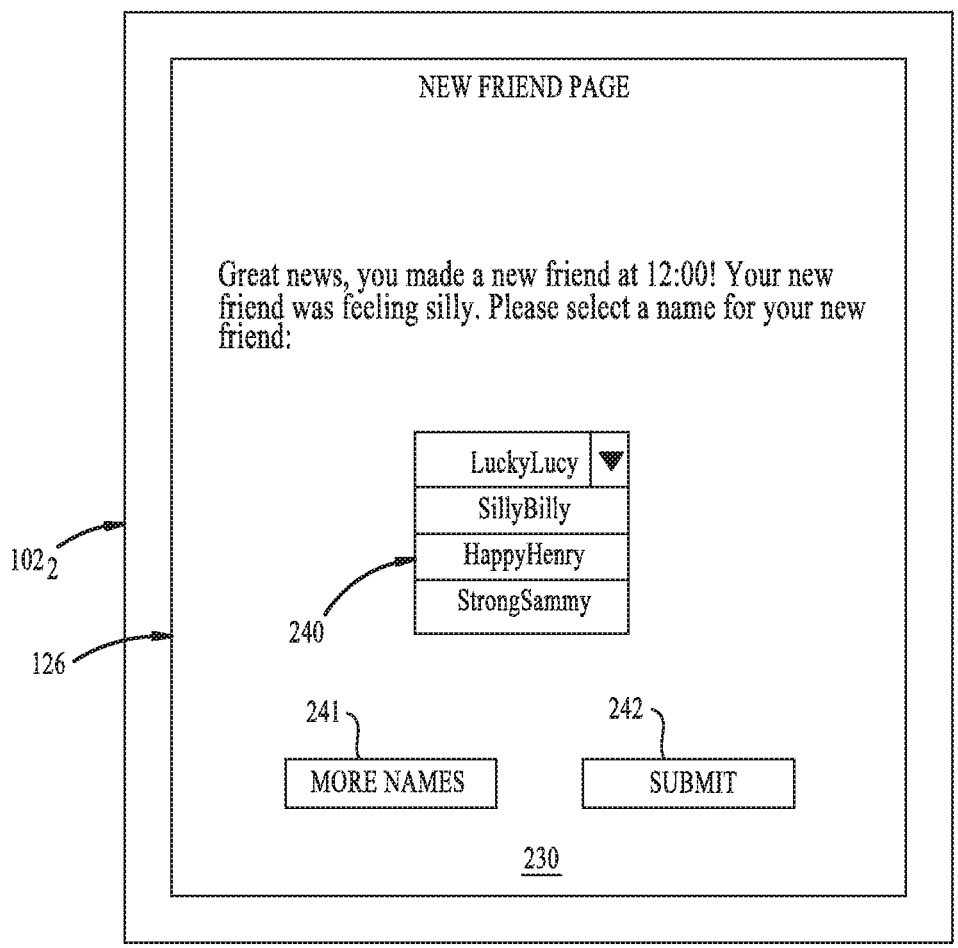

FIG. 2C depicts an example graphical user interface (GUI) 230 outputted on the display 126 of computing device $102_2$. The GUI 230, generated by the interaction application 112B, provides a plurality of predefined names in a dropdown list 240 to associate with the recently created friendship. The user may select one of the predefined names in the list 240 to associate with the user of wearable device $101_1$. The predefined names in the list 240 may be of a plurality of predefined names provided by the interaction application 112B. If the user wishes to see different names, the user may select the "more names" button 241. Once the user selects a predefined name, the user may submit the selection via the submit button 242.

FIG. 2D depicts the user profiles 120 after the user selected "SillyBilly" as the predefined name in the dropdown list 240 of FIG. 2C (e.g., based on the emotional state associated with the tile $118_1$). As shown, the entry numbered 2 in the user profile 120 is now associated with the username "SillyBilly", and again includes the tile identifier $118_1$ and the timestamp at which the friendship relationship was established. Advantageously, the user profile 120 does not include any personally identifiable information of the user of wearable device $101_1$.

Figure 3A:
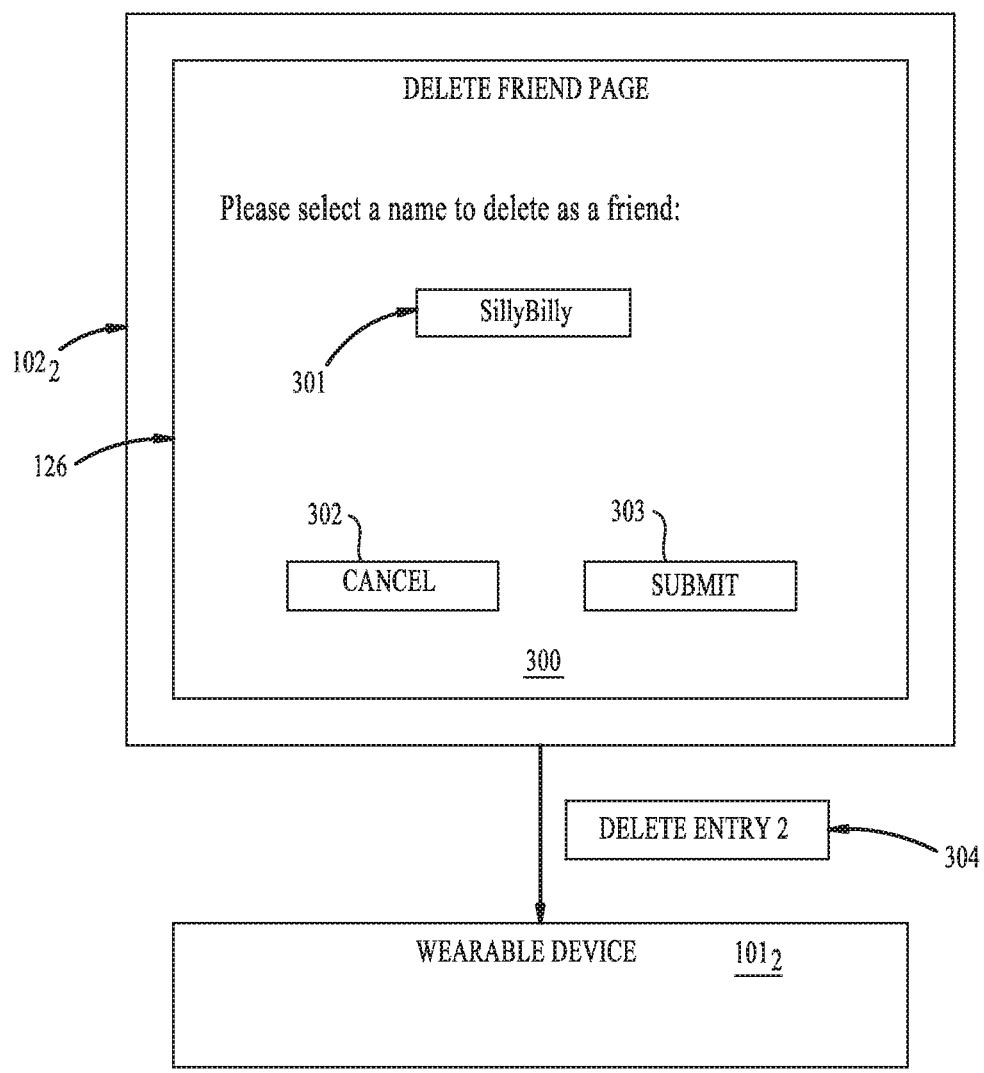
FIGS. 3A-3B illustrate examples of deleting wearable device friendships without requiring the users to exchange personal information, according to one embodiment.

FIG. 3A illustrates an example of deleting wearable device friendship relationships without requiring the users to exchange personal information, according to one embodiment. As shown, FIG. 3A depicts an example GUI 300 to delete a friend generated by the interaction application 112B on the computing device $102_2$. As shown, the user has specified to delete "SillyBilly" via the GUI element 301. The GUI element 301 may be a dropdown list including each predefined name in the user profiles 120. If the user wishes to cancel the deletion operation, the user may toggle the cancel button 302. If, however, the user toggles the submit button 303, the interaction application 112B deletes the entry in the user profile 120 that matches the record entry associated with the selected predefined name (in this example, entry 2). Furthermore, the interaction application 112B generates and transmits a request 304 to the wearable device $101_2$ specifying to delete the entry 2 from the device data 119. Once received, the interaction application 112A on the wearable device $101_2$ deletes the corresponding entry from the device data 119.

Figure 3B:
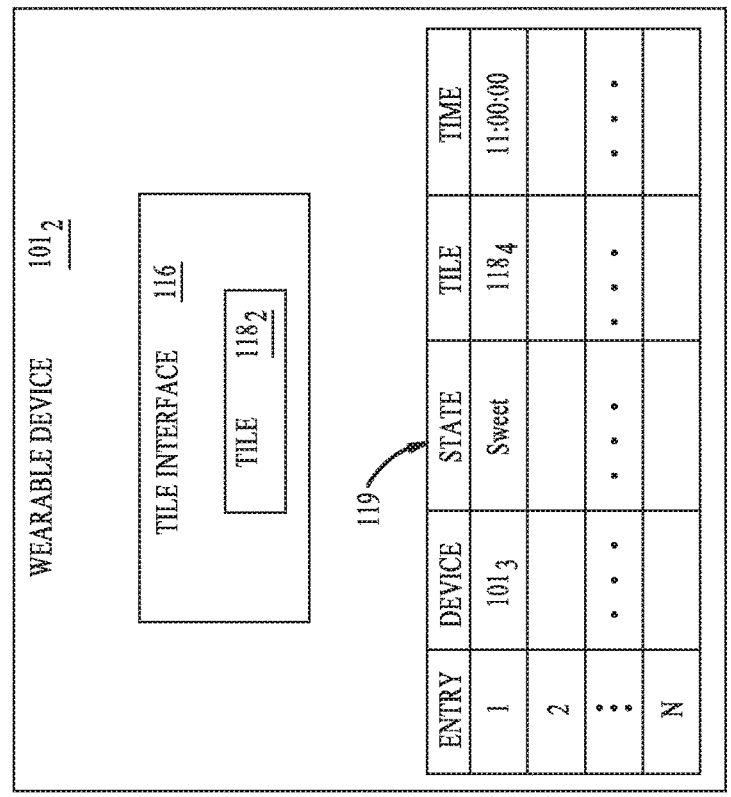

FIG. 3B depicts the device data 119 of the wearable device $101_2$ and the user profiles 120 of the computing device $102_2$ after the user has specified to delete the friendship relationship with the user "SillyBilly". As shown, the device data 119 no longer specifies the device identifier of wearable device $101_2$, the tile identifier of the tile $118_1$, and the timestamp at which the friendship with wearable device $101_1$ was created. Similarly, the user profile 120 of computing device $102_1$ no longer includes an indication of a contact record for the user SillyBilly, the associated tile $118_1$, the second entry in the device data 119, and the timestamp at which the friendship was created.

FIG. 4 is a flow chart illustrating a method 400 to manage wearable device friendships without requiring the users to exchange personal information, according to one embodiment. As shown, the method 400 begins at block 410, where a first wearable device $101_{1-N}$ detects a second wearable device $101_{1-N}$ within a predefined distance. Generally, the wearable devices $101_{1-N}$ detect each other based on receiving broadcast wireless transmissions via the network interfaces 113. At block 420, the users of the first and second wearable devices $101_{1-N}$ initiate the establishment of a friendship by pressing a button on the respective wearable devices $101_{1-N}$ for a predefined amount of time. In at least one embodiment, the users must initiate the establishment of the friendship within a predefined amount of time (e.g., 4 seconds). At block 430, the first and second wearable devices $101_{1-N}$ generate a respective indication of the friendship without exchanging personal information. Generally, the interaction application 112A of each wearable device $101_{1-N}$ transmits the unique identifier (e.g., MAC address) of the wearable device $101_{1-N}$ an indication of the tile $118_{1-N}$ currently in the tile interface 116 of the wearable device $101_{1-N}$, and the emotional state associated with the tile $118_{1-N}$ to the other wearable device $101_{1-N}$. Doing so allows the interaction application 112A of the first and second wearable devices $101_{1-N}$ to create an entry in the device data 119 reflecting the friendship.

At block 440, described in greater detail with reference to FIG. 6, a first computing device $102_{1-N}$ associated with the first wearable device $101_{1-N}$ and a second computing device $102_{1-N}$ associated with the second wearable device $101_{1-N}$ generate and store an indication of the friendship relationship between the first and second wearable devices $101_{1-N}$ without exchanging personal information identifying the associated users. As previously stated, the interaction application 112 6 of the computing devices $102_{1-N}$ receive indications of the corresponding entry in the device data 119, the identifier of the tile $118_{1-N}$, the emotional state associated with the tile $118_{1-N}$, and the timestamp at which the friendship was created from the interaction application 112A. The respective users may then specify a name to associate with the friendship, which is stored in the user profiles 120 of the computing devices $102_{1-N}$ by the interaction application 112B without including any personally identifiable information of the associated users. At block 450, described in greater detail with reference to FIG. 7, the wearable devices $101_{1-N}$ and/or the computing devices $102_{1-N}$ delete the friendship responsive to receiving user input specifying to delete the friendship. Generally, the user may initiate the deletion via the respective computing device $102_{1-N}$, where the interaction application 112B deletes the corresponding record from the user profiles 120. The interaction application 112B also transmits an indication of the record identifier to the interaction application 112A on the associated wearable device $101_{1-N}$, which then deletes the corresponding entry in the device data 119.

FIG. 5 is a flow chart illustrating a method 500 corresponding to block 430 to generate and store an indication of friendship in wearable devices without requiring the users to exchange personal information, according to one embodiment. As shown, the method 500 begins at block 510, where the interaction application 112A of the first wearable device $101_{1-N}$ receives, from the interaction application 112A of the second wearable device $101_{1-N}$ via the network interface 113, a device identifier (e.g., the MAC address) of the second wearable device $101_{1-N}$, an identifier of the tile $118_{1-N}$ of the second wearable device $101_{1-N}$, and the emotional state associated with the tile $118_{1-N}$ of the second wearable device $101_{1-N}$. At block 520, the interaction application 112A of the first wearable device $101_{1-N}$ identifies an available entry in the device data 119 of the first wearable device $101_{1-N}$. At block 530, the interaction application 112A of the first wearable device $101_{1-N}$ stores an indication of the friendship relationship with the second wearable device $101_{1-N}$ at the identified entry. The indication may include the received device identifier of the second wearable device $101_{1-N}$, the received tile identifier of the tile $118_{1-N}$ of the second wearable device $101_{1-N}$, the emotional state associated with the tile $118_{1-N}$, and a timestamp reflecting when the friendship relationship is created. The second wearable device $101_{1-N}$ may similarly perform the steps of the method 500 to store an indication of the friendship relationship with the first wearable device $101_{1-N}$.

Figure 6:
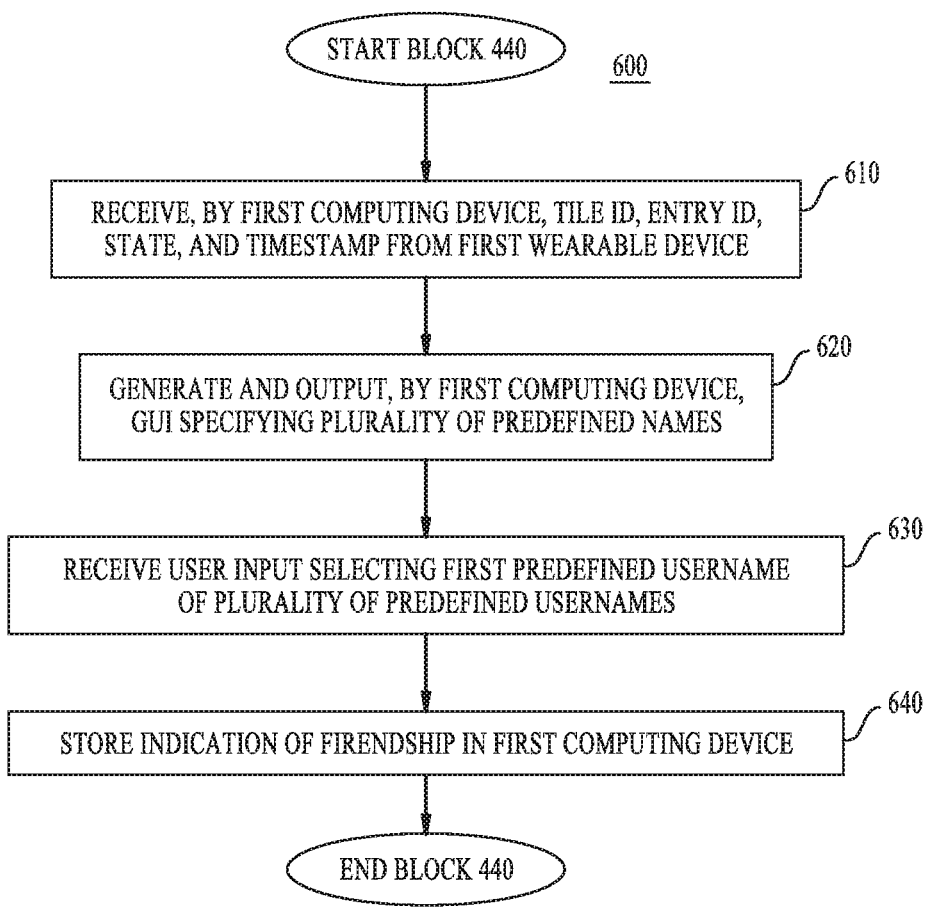
FIG. 6 is a flow chart illustrating a method to generate and store an indication of friendship in computing devices without requiring the users to exchange personal information, according to one embodiment.

FIG. 6 is a flow chart illustrating a method 600 corresponding to block 440 to generate and store an indication of friendship in computing devices without exchanging personal information, according to one embodiment. As shown, the method 600 begins at block 610, where the interaction application 112B of a first computing device $102_{1-N}$ receives, from the interaction application 112A of the first wearable device $101_{1-N}$, the tile identifier, emotional state of the tile, entry identifier, and timestamp reflecting the friendship relationship with the second wearable device $101_{1-N}$. At block 620, the interaction application 112B of the first computing device $102_{1-N}$ generates and outputs a GUI (e.g., the GUI 230) specifying a plurality of predefined usernames to associate with the user of the second wearable device $101_{1-N}$. At block 630, the interaction application 112B of the first computing device $102_{1-N}$ receives user input selecting a first predefined username of the plurality of predefined usernames. At block 640, the interaction application 112B of the first computing device $102_{1-N}$ stores an indication of the friendship with the second wearable device $101_{1-N}$ in the user profiles 120. The indication includes the entry of the device data 119, the tile identifier, emotional state, and timestamp received at block 610, as well as the first predefined username selected at block 630.

Figure 7:
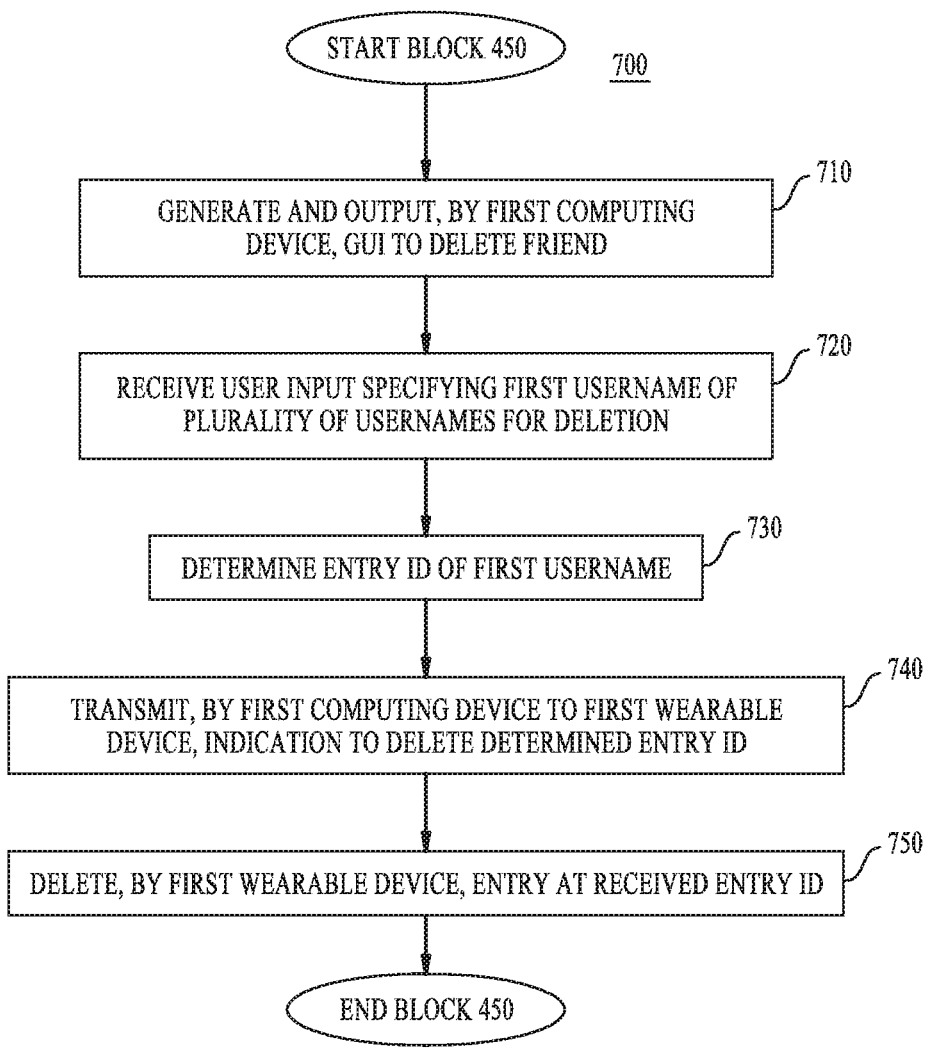
FIG. 7 is a flow chart illustrating a method to delete a friendship without requiring the users to exchange personal information, according to one embodiment.

FIG. 7 is a flow chart illustrating a method 700 corresponding to block 450 to delete a friendship without requiring the users to exchange personal information, according to one embodiment. As shown, the method 700 begins at block 710, where the interaction application 112B of the first computing device $102_{1-N}$ generates and outputs a GUI (e.g., the GUI 300) allowing a user to delete a friend. The GUI includes the username of each user in the user profiles 120 of the first computing device $102_{1-N}$. As in the user profiles 120, the GUI includes (e.g., in the source code of the GUI), the entry ID associated with each username from the user profiles 120. At block 720, the interaction application 112B of the first computing device $102_{1-N}$ receives user input specifying to delete a first username of the plurality of usernames outputted in the GUI. At block 730, the interaction application 112B of the first computing device $102_{1-N}$ determines the entry ID associated with the first username (e.g., based on the source code of the GUI). At block 740, the interaction application 112B of the first computing device $102_{1-N}$ transmits, to the interaction application 112A of the first wearable device $101_{1-N}$, an indication to delete the record from the device ID corresponding to the determined entry ID. At block 750, the interaction application 112A of the first wearable device $101_{1-N}$ deletes the entry at the received entry ID from the device data 119 of the first wearable device $101_{1-N}$.

Figure 8:
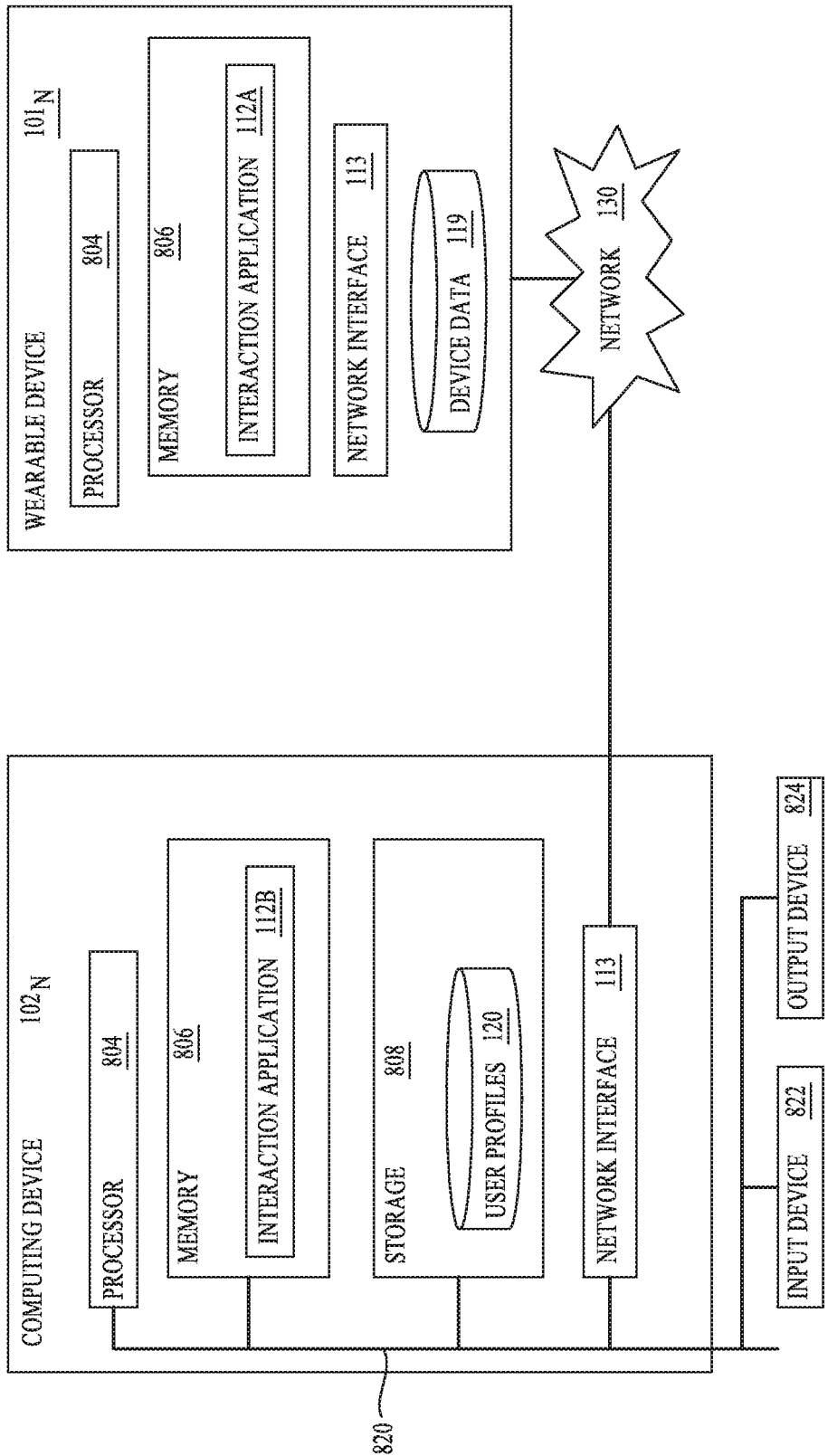
FIG. 8 illustrates a system which manages wearable device friendships without requiring the users to exchange personal information, according to one embodiment.

FIG. 8 illustrates a system 800 which manages wearable device friendships without requiring the users to exchange personal information, according to one embodiment. The networked system 800 includes a computing device $102_N$ of FIGS. 1A-1B. The computing device 102 may also be connected to other computing devices $102_{1-N}$ and/or wearable devices $101_{1-N}$ via a network 130. In general, the network 130 may be a telecommunications network and/or a wide area network (WAN). In a particular embodiment, the network 130 is the Internet. In another embodiment, the network 130 is a Bluetooth® network.

The computing device $102_N$ generally includes a processor 804 which obtains instructions and data via a bus 820 from a memory 806 and/or a storage 808. The computing device $102_N$ may also include one or more network interface devices 113, input devices 822, and output devices 824 connected to the bus 820. The computing device $102_N$ is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 804 is a programmable logic device that performs instruction, logic, and mathematical processing, and may be representative of one or more CPUs. The network interface device 113 may be any type of network communications device allowing the computing device $102_N$ to communicate with other computers via the network 130.

The storage 808 is representative of hard-disk drives, solid state drives, flash memory devices, optical media and the like. Generally, the storage 808 stores application programs and data for use by the computing device $102_N$. In addition, the memory 806 and the storage 808 may be considered to include memory physically located elsewhere; for example, on another computer coupled to the computing device $102_N$ via the bus 820.

The input device 822 may be any device for providing input to the computing device 102. For example, a keyboard and/or a mouse may be used. The input device 822 represents a wide variety of input devices, including keyboards, mice, controllers, and so on. Furthermore, the input device 822 may include a set of buttons, switches or other physical device mechanisms for controlling the computing device $102_N$. The output device 824 may include output devices such as monitors, touch screen displays, and so on. As shown, the memory 806 contains the interaction application 112B, while the storage 808 contains the user profiles 120, each described in greater detail above.

As shown, the wearable device $101_N$ of FIGS. 1A-1B also includes a processor 804, a memory 806 executing the interaction application 112A, a network interface 113, and the device data 119, each described in greater detail above. Generally, the system 800 is configured to implement all functionality described above with reference to FIGS. 1-7.

Advantageously, embodiments disclosed herein provide techniques to allow users of wearable devices to establish friendship relationships and interact with other wearable devices without requiring the users to exchange personally identifiable information. Doing so protects privacy and reduces the amount of data storage needed to maintain relationships in the wearable devices and/or computing devices.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   detecting, by a first wearable device, a second wearable device within a predefined distance of the first wearable device;
   receiving, by the first wearable device, input specifying to establish a relationship with the second wearable device;
   receiving, by the first wearable device from the second wearable device via wireless data transmissions, an identifier of the second wearable device, a tile identifier of a tile communicably coupled to a tile interface of the second wearable device, and a state associated with the tile, wherein the first wearable device does not receive identifying attributes of a second user of the second wearable device;
   responsive to the input specifying to establish the relationship, storing, in a first entry of a data structure of the first wearable device, an indication of the relationship with the second wearable device, wherein the indication comprises the identifier of the second wearable device, the tile identifier, and the state associated with the tile; and
   receiving, from a first user of the first wearable device, a selection of a first username to associate with the second user of the second wearable device, wherein the first username is one of a set of predefined usernames that do not include personally identifiable information, and wherein, prior to the selection, the first username is random and is not associated with the second wearable device or the second user.

2. The method of claim 1, further comprising:
   receiving, by a first computing device from the first wearable device, an indication of the first entry, the tile identifier, the state associated with the tile, and a timestamp reflecting when the relationship was established;
   outputting, via a first graphical user interface (GUI) of the first computing device, a plurality of predefined usernames as alternative usernames for the second user, wherein the plurality of predefined usernames are generated by the first computing device and are not associated with the second wearable device or the second user;
   receiving, via the first GUI of the first computing device, input specifying the first username of the plurality of predefined usernames; and
   storing, in a user profile of the first computing device, an indication of the first entry, the tile identifier, the timestamp, the state associated with the tile, and the first username, wherein the user profile is associated with the second user of the second wearable device without including personally identifiable information of the second user.

3. The method of claim 2, further comprising:
   receiving, via a second GUI of the first computing device, input specifying to delete the user profile associated with the second user of the second wearable device; and
   deleting the user profile associated with the second user of the second wearable device from the first computing device.

4. The method of claim 3, further comprising:
   transmitting, by the first computing device to the first wearable device, an indication specifying to delete the first entry from the data structure of the first wearable device; and
   deleting, by the first wearable device, the first entry from the data structure responsive to receiving the indication from the first computing device.

5. The method of claim 1, further comprising:
   outputting, by a plurality of light emitting diodes (LEDs) of the first wearable device, feedback associated with the tile identifier.

6. The method of claim 1, further comprising:
   receiving, by the first wearable device, an indication from the second wearable device specifying that the second wearable device has received input specifying to establish the relationship with the first wearable device.

7. The method of claim 1, wherein the identifier of the second wearable device comprises a media access control (MAC) address of a wireless network interface of the second wearable device.

8. A non-transitory computer-readable storage medium having computer-readable program code embodied therewith, the computer-readable program code executable to perform an operation comprising:

detecting, by a first wearable device, a second wearable device within a predefined distance of the first wearable device;

receiving, by the first wearable device, input specifying to establish a relationship with the second wearable device;

receiving, by the first wearable device from the second wearable device via wireless data transmissions, an identifier of the second wearable device, a tile identifier of a tile communicably coupled to a tile interface of the second wearable device, and a state associated with the tile, wherein the first wearable device does not receive identifying attributes of a second user of the second wearable device;

responsive to the input specifying to establish the relationship, storing, in a first entry of a data structure of the first wearable device, an indication of the relationship with the second wearable device, wherein the indication comprises the identifier of the second wearable device, the tile identifier, and the state associated with the tile; and receiving, from a first user of the first wearable device, a selection of a first username to associate with the second user of the second wearable device, wherein the first username is one of a set of predefined usernames that do not include personally identifiable information, and wherein, prior to the selection, the first username is random and is not associated with the second wearable device or the second user.

9. The non-transitory computer-readable storage medium of claim 8, the operation further comprising:

receiving, by a first computing device from the first wearable device, an indication of the first entry, the tile identifier, the state associated with the tile, and a timestamp reflecting when the relationship was established;

outputting, via a first graphical user interface (GUI) of the first computing device, a plurality of predefined usernames as alternative usernames for the second user, wherein the plurality of predefined usernames are generated by the first computing device and are not associated with the second wearable device or the second user;

receiving, via the first GUI of the first computing device, input specifying the first username of the plurality of predefined usernames; and storing, in a user profile of the first computing device, an indication of the first entry, the tile identifier, the timestamp, the state associated with the tile, and the first username, wherein the user profile is associated with the second user of the second wearable device without including personally identifiable information of the second user.

10. The non-transitory computer-readable storage medium of claim 9, the operation further comprising:

receiving, via a second GUI of the first computing device, input specifying to delete the user profile associated with the second user of the second wearable device; and deleting the user profile associated with the second user of the second wearable device from the first computing device.

11. The non-transitory computer-readable storage medium of claim 10, the operation further comprising:

transmitting, by the first computing device to the first wearable device, an indication specifying to delete the first entry from the data structure of the first wearable device; and deleting, by the first wearable device, the first entry from the data structure responsive to receiving the indication from the first computing device.

12. The non-transitory computer-readable storage medium of claim 8, the operation further comprising:

outputting, by a plurality of light emitting diodes (LEDs) of the first wearable device, feedback associated with the tile identifier.

13. The non-transitory computer-readable storage medium of claim 8, the operation further comprising:

receiving, by the first wearable device, an indication from the second wearable device specifying that the second wearable device has received input specifying to establish the relationship with the first wearable device.

14. The non-transitory computer-readable storage medium of claim 8, wherein the identifier of the second wearable device comprises a media access control (MAC) address of a wireless network interface of the second wearable device.

15. A system, comprising:
a computer processor; and
a memory containing a program which when executed by the processor performs an operation comprising:

detecting, by a first wearable device, a second wearable device within a predefined distance of the first wearable device;

receiving, by the first wearable device, input specifying to establish a relationship with the second wearable device;

receiving, by the first wearable device from the second wearable device via wireless data transmissions, an identifier of the second wearable device, a tile identifier of a tile communicably coupled to a tile interface of the second wearable device, and a state associated with the tile, wherein the first wearable device does not receive identifying attributes of a second user of the second wearable device;

responsive to the input specifying to establish the relationship, storing, in a first entry of a data structure of the first wearable device, an indication of the relationship with the second wearable device, wherein the indication comprises the identifier of the second wearable device, the tile identifier, and the state associated with the tile; and receiving, from a first user of the first wearable device, a selection of a first username to associate with the second user of the second wearable device, wherein the first username is one of a set of predefined usernames that do not include personally identifiable information, and wherein, prior to the selection, the first username is random and is not associated with the second wearable device or the second user.

16. The system of claim 15, the operation further comprising:

receiving, by a first computing device from the first wearable device, an indication of the first entry, the tile identifier, the state associated with the tile, and a timestamp reflecting when the relationship was established;

outputting, via a first graphical user interface (GUI) of the first computing device, a plurality of predefined usernames as alternative usernames for the second user, wherein the plurality of predefined usernames are generated by the first computing device and are not associated with the second wearable device or the second user;

receiving, via the first GUI of the first computing device, input specifying the first username of the plurality of predefined usernames; and storing, in a user profile of the first computing device, an indication of the first entry, the tile identifier, the timestamp, the state associated with the tile, and the first username, wherein the user profile is associated with the second user of the second wearable device without including personally identifiable information of the second user.

17. The system of claim 16, the operation further comprising:

receiving, via a second GUI of the first computing device, input specifying to delete the user profile associated with the second user of the second wearable device; and deleting the user profile associated with the second user of the second wearable device from the first computing device.

18. The system of claim 17, the operation further comprising:

transmitting, by the first computing device to the first wearable device, an indication specifying to delete the first entry from the data structure of the first wearable device; and deleting, by the first wearable device, the first entry from the data structure responsive to receiving the indication from the first computing device.

19. The system of claim 17, the operation further comprising:

outputting, by a plurality of light emitting diodes (LEDs) of the first wearable device, feedback associated with the tile identifier.

20. The system of claim 17, wherein the identifier of the second wearable device comprises a media access control (MAC) address of a wireless network interface of the second wearable device, the operation further comprising:

receiving, by the first wearable device, an indication from the second wearable device specifying that the second wearable device has received input specifying to establish the relationship with the first wearable device.

* * * * *